United States Patent
Tsai et al.

(12)

(10) Patent No.: US 6,622,213 B2
(45) Date of Patent: Sep. 16, 2003

(54) TWO-WAY CACHE SYSTEM AND METHOD FOR INTERFACING A MEMORY UNIT WITH A PERIPHERAL DEVICE USING FIRST AND SECOND CACHE DATA REGIONS

(75) Inventors: Chau-Chad Tsai, Taipei (TW); Chen-Ping Yang, Taipei (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 214 days.

(21) Appl. No.: 09/881,861

(22) Filed: Jun. 15, 2001

(65) Prior Publication Data

US 2002/0026562 A1 Feb. 28, 2002

(30) Foreign Application Priority Data

Aug. 9, 2000 (TW) ........................ 89115996 A

(51) Int. Cl.⁷ .................. G06F 13/00; G09G 5/399
(52) U.S. Cl. .................. 711/137; 711/129; 711/157; 711/128; 345/540; 345/545; 345/557; 345/558
(58) Field of Search .................. 711/137, 128, 711/157, 129; 345/540, 545, 557, 558

(56) References Cited

U.S. PATENT DOCUMENTS 5,732,242 A * 3/1998 Mowry ................. 711/137
6,138,213 A 10/2000 McMinn ................. 711/137
6,178,483 B1 * 1/2001 Runaldue et al. ........... 711/137
6,219,760 B1 * 4/2001 McMinn ................. 711/137
6,393,548 B1 * 5/2002 Kerstein et al. ............ 712/43

* cited by examiner

Primary Examiner—Glenn Gossage
(74) Attorney, Agent, or Firm—J.C. Patents

(57) ABSTRACT

A two-way cache system for interfacing with a peripheral device and a method of operating a two-way cache system for carrying out data transmission between a peripheral device and a memory unit. The cache system has a two-way first-in first-out buffer region and a two-way cache controller. The two-way first-in first-out buffer region further has a first cache data region and a second cache data region. The first cache data region and the second cache data region are capable of holding a batch of first cache data and a batch of second cache data. The two-way cache controller receives a read request from the peripheral device. According to the read request, the requested data and data that ensues or comes after the requested data are retained by the two-way first-in first-out buffer (FIFO) region. If the peripheral device continues to request more data by maintaining a FRAME signal line in an enabled state, the first cache data region and the second cache data region are alternately used to read in subsequent data. A check may be made to see if requested data stored inside the two-way cache buffer region is coherent or consistent with data stored inside the memory unit.

9 Claims, 3 Drawing Sheets

TWO-WAY CACHE SYSTEM AND METHOD FOR INTERFACING A MEMORY UNIT WITH A PERIPHERAL DEVICE USING FIRST AND SECOND CACHE DATA REGIONS

CROSS-REFERENCE TO RELATED APPLICATION

This application claims the priority benefit of Taiwan application Ser. No. 9115996, filed on Aug. 9, 2000.

BACKGROUND OF THE INVENTION

1. Field of Invention

The present invention relates to a cache system and method of operation for interfacing with peripheral devices. More particularly, the present invention relates to a two-way cache system and method of operation for interfacing with peripheral devices.

2. Description of Related Art

At present, the one-way cache system is the most common method for interfacing with peripheral devices. In a one-way cache system, the cache memory stores only the most recent batch of data read from a peripheral device. A batch of data in this type of cache memory is equivalent to a line of data or 32 bytes. Depending on actual conditions, the buffer area for holding the data ranges from two to eight lines. Hence, on receiving a read command, this type of cache system also pre-fetches a line of data besides reading out data required by the read operation. After sending out the needed portion in the first line of data to a peripheral device, data within the first data line is discarded. Only the pre-fetched data is retained, meaning that the data within the second data line is held in the buffer region.

However, not every one of the peripheral devices read data based on a data line. In other words, some peripheral devices may just need the front portion of the data within the first data line. Hence, after the front portion of the data is retrieved, the one-way cache system discards data in the first data line while retaining the second data line. When some other peripheral devices need to access the back portion of the data discarded by the cache system, the data must be read from memory again. After reading in the first data line anew, the previously stored data in the second data line is wiped out. If data in the second data line is needed again, the data has to be read from memory again. Such double reading not only decreases processing speed but also increases the number of data transmissions. Ultimately, a greater loading at the peripheral device interface may result, leading to a lower operating efficiency.

A solution is provided in U.S. Pat. No. 6,138,213, titled "Cache including a prefetch way for storing prefetch cache lines and configured to move a prefetched cache line to a non-prefetch way upon access to the prefetched cache line," by McMinn et al. In this patent, a cache employs one or more prefetch ways for storing prefetch cache lines and one or more ways for storing accessed cache lines. Prefetch cache lines are stored into the prefetch way, while cache lines fetched in response to cache misses for requests initiated by a microprocessor connected to the cache are stored into the non-prefetch ways. Accessed cache lines are thereby maintained within the cache separately from prefetch cache lines. When a prefetch cache line is presented to the cache for storage, the prefetch cache line may displace another prefetch cache line but does not displace an accessed cache line. A cache hit in either the prefetch way or the non-prefetch ways causes the cache line to be delivered to the requesting microprocessor in a cache hit fashion. The cache is further configured to move prefetch cache lines from the prefetch way to the non-prefetch way if the prefetch cache lines are requested (i.e. they become accessed cache lines). Instruction cache lines may be moved immediately upon access, while data cache line accesses may be counted and a number of accesses greater than a predetermined threshold value may occur prior to moving the data cache line from the prefetch way to the non-prefetch way. Additionally, movement of an accessed cache line from the prefetch way to the non-prefetch way may be delayed until the accessed cache line is to be replaced by a prefetch cache line.

SUMMARY OF THE INVENTION

Accordingly, one object of the present invention is to provide a two-way cache system and method of operation for interfacing with peripheral devices. The cache system is capable of downloading two sections of data in each reading so that utilization rate of the cache memory is increased and data transmission loading is lowered, thereby increasing overall performance of the peripheral device interface.

To achieve these and other advantages and in accordance with the purpose of the invention, as embodied and broadly described herein, the invention provides a two-way cache system for interfacing with a peripheral device. The two-way cache system is suitable for transmitting data between a peripheral device and a memory unit and includes a two-way first-in first-out (FIFO) buffer region and a two-way cache controller. The two-way first-in first-out (FIFO) buffer region includes a first cache data region and a second cache data region. The first cache data region is capable of holding a batch of first cache data. The second cache data region is capable of holding a batch of second cache data. The two-way cache controller is capable of receiving a read request from the peripheral device. According to the read request, the two-way first-in first-out buffer region retains a batch of requested data that meets the read request and a batch of ensuing data that comes after the requested data. In addition, the peripheral device enables a FRAME signal line continuously so that when data input continues to be requested, data is read one by one by alternating between the first cache data region and the second cache data region.

In one embodiment of this invention, a relatively complicated circuit but time saving operating method is used. The operating method includes checking whether the requested data is already present inside the two-way first-in first-out buffer region when the two-way cache controller receives the read request. If the requested data is within the first cache data region (the second cache data region), the two-way cache controller checks for coherence between the first cache data (the second cache data) and the data stored inside the memory unit.

If the data stored in the first cache (the second cache) and the data stored in the memory unit are non-coherent, the requested data is read out from the memory unit by the two-way cache controller. Newly read data is then stored to the first cache data region (the second cache data region). The second cache data (the first cache data) are next checked to see if the aforementioned batch of ensuing data is also included. If the second cache data (the first cache data) includes the batch of ensuing data, the second cache data (the first cache data) and the memory unit data are checked for coherence. If the second cache data (the first cache data) and the data in the memory unit are non-coherent, the batch of ensuing data is read from the memory unit and puts into in the second cache data region (the first cache data region). Furthermore, if the second cache data (the first cache data) does not include the ensuing batch of data, the batch of ensuing data is read from the memory unit into the second cache memory region (the first cache memory region).

When the first cache data (the second cache data) and the memory data are coherent, the two-way cache controller checks the second cache data (the first cache data) to see if the batch of ensuing data is also included. If the second cache data (the first cache data) includes the batch of ensuing data, the second cache data (the first cache data) and the data stored in the memory unit are checked for coherence. If the second cache data (the first cache data) and the data in the memory unit are non-coherent, the batch of ensuing data is read from the memory unit and put into the second cache data region (the first cache data region). Furthermore, if the second cache data (the first cache data) does not include the batch of ensuing data, the batch of ensuing data is read from the memory unit into the second cache data region (the first cache data region).

When the requested data is not included inside the two-way first-in first-out buffer region, the two-way cache controller reads out the requested data as well as the aforementioned batch of ensuing data from the memory unit. The requested data and the batch of ensuing data are put in sequence into the first cache data region and the second cache data region, respectively.

If the peripheral device keeps requesting input data (in other words, a FRAME enable signal is maintained) after the requested data is read, the two-way cache controller controls the data that comes after the second cache data to be read into the first cache data region and becomes a batch of first cache data when the peripheral device reads in the second cache data. When the peripheral device reads the first cache data, the data that comes after the first cache data is read from the memory unit into the second cache data region to become a batch of second cache data.

In another embodiment of this invention, the number of data comparisons is reduced through at most one additional reading operation. Hence, a simpler circuit than the aforementioned embodiment can be used. In this embodiment, only the requested data is compared. The batch of ensuing data is directly read from the memory unit without first making a hit-or-miss comparison between the ensuing data and data originally stored inside the two-way first-in first-out buffer region. Although an additional reading operation (reading the ensuing batch of data) is required with such an arrangement, execution rate at the peripheral device interface can still be improved. Moreover, since hit-or-miss comparisons are eliminated, there is no need for a hit-or-miss comparison circuit. That is why the circuit in this embodiment is simplified.

In brief, this invention utilizes a two-way cache system to improve the operating efficiency at the peripheral device interface. The method of operating the cache system is an improvement over the conventional cache system. In addition, the circuit used in this invention is less complicated compared with a conventional cache system.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
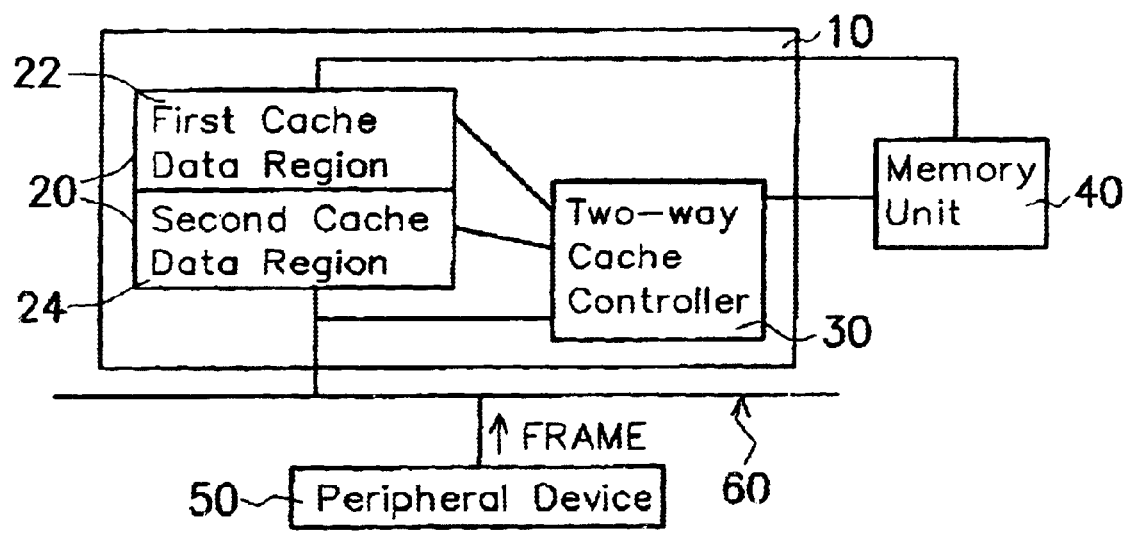
FIG. 1 is a diagram showing the connections in a cache system according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram showing connections in a cache system according to one preferred embodiment of this invention. In this embodiment, the cache system includes a peripheral device interface control chip 10, a memory unit 40, a peripheral device 50 and a peripheral device interface bus 60. The peripheral device interface control chip 10 includes a two-way cache controller 30 and a two-way first-in first-out (FIFO) buffer region 20. The two-way first-in first-out buffer region 20 further includes a first cache data region 22 and a second cache data region 24. The two-way cache controller 20 can refresh the first cache data region 22 and the second cache data region 24 together.

Figure 2:
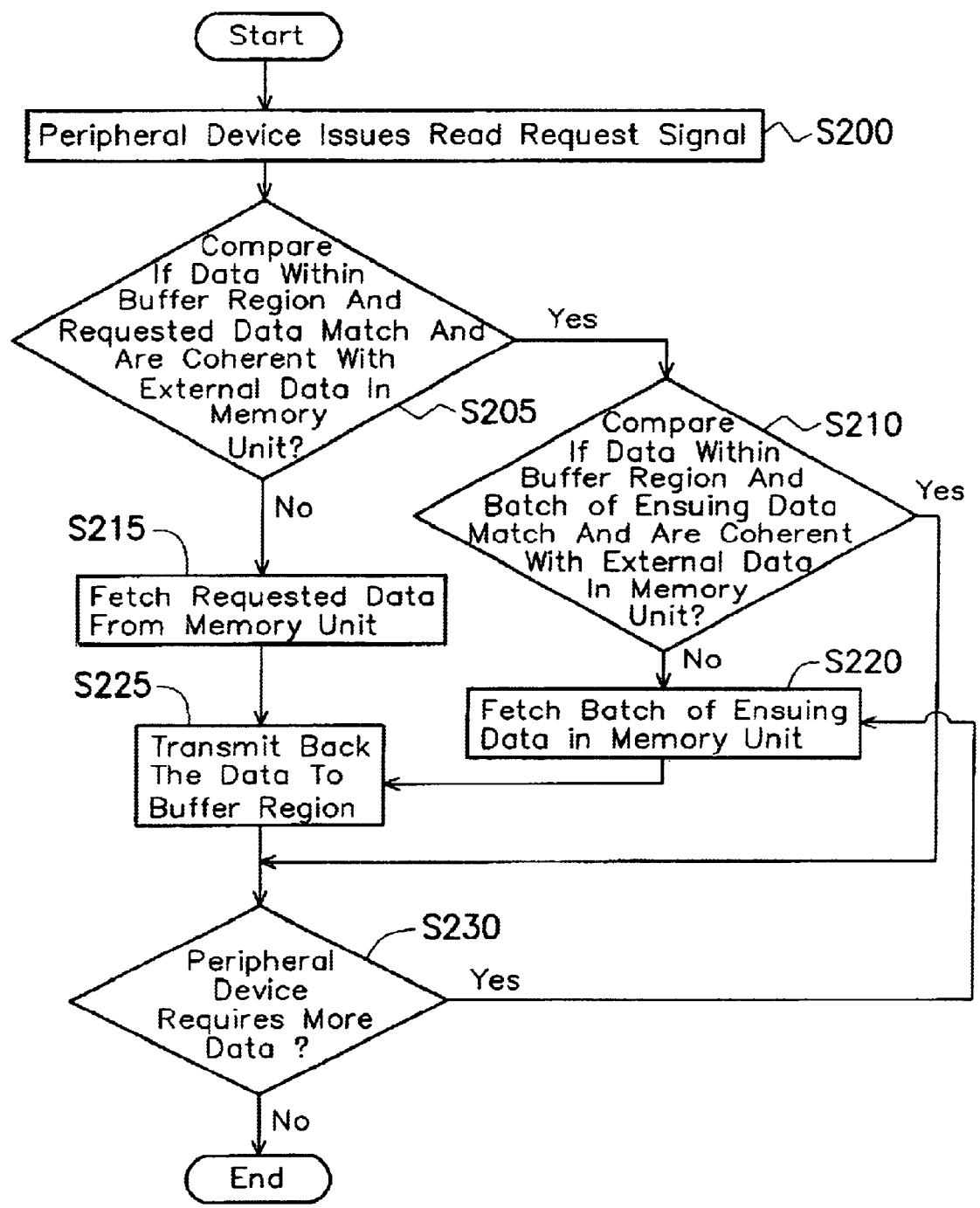
FIG. 2 is a flow chart showing the steps in operating the cache system according to one preferred embodiment of this invention.

FIG. 2 is a flow chart showing the steps in operating the cache system according to one preferred embodiment of this invention. First, referring to FIG. 1 and FIG. 2, the peripheral device 50 issues a read request in step S200. The read request is transmitted to the two-way cache controller 30 via the peripheral device interface bus 60. After receiving the read request, the two-way cache controller 30 compares data stored inside the two-way first-in first-out buffer region 20 with the required data in step S205. If the requested data and the data stored in the two-way first-in first-out buffer region 20 are the same, coherence between the data stored inside the two-way first-in first-out buffer region and external data in the memory unit 40 is checked by a comparison.

In this embodiment, the first cache data region 22 is capable of holding a batch of first cache data while the second cache data region 24 is capable of holding a batch of second cache data. The two batches of cache data have a maximum length of 32 bytes. When the data stored inside the two-way first-in first-out buffer region 20 and the requested data are compared in step S205 above, the first cache data and the second cache data are sequentially selected to compare with the requested data.

If data within the two-way first-in first-out buffer region 20 does not match the requested data, or if the two batches of data match but are incoherent with the data stored in the memory unit 40, the two-way cache controller 30 reads out the batch of requested data from the memory unit 40 in step S215. In step S225, the batch of requested data is transmitted back to the two-way first-in first-out buffer region 20 and put into the first cache data region 22 (or the second cache memory region 24). In step S230, it is checked whether the peripheral device requires more data. If the FRAME signal line on the peripheral device 50 is still enabled, this indicates that the peripheral device 50 needs more data and the system jumps to step S220. In step S220, a batch of ensuing data that comes after the requested data is read from the memory unit 40 and then the execution returns to step S225. In step S225, the batch of ensuing data is stored in another cache data region. Here, the other cache data region refers to the second cache data region 24 (or the first cache data region 22).

If the peripheral device 50 continues to issue data request signals, the two-way cache controller 30 goes to the memory unit 40 to fetch the data that comes after the second cache data and puts the data into the first cache data region 22 when the second cache data is being transmitted to the peripheral device 50. When the first cache data is being transmitted to the peripheral device 50, the two-way cache controller 30 will also go to the memory unit 40 to fetch the data that comes after the first cache data and puts the data in the second cache data region 24. This process is repeated until the peripheral device 50 no longer enables the FRAME signal.

In step S205, if the data inside two-way first-in first-out buffer region 20, for example, the first cache data (or the second cache data), matches the requested data, and the first cache data (or the second cache data) and the external data in the memory unit are coherent, the first cache data (or the second cache data) is transferred to the peripheral device 50 and then step S210 is executed. In step S210, the two-way cache controller 30 compares the data in the other cache data region, for example, the second cache data (or the first cache data), with the aforementioned batch of ensuing data to look for any match. If there is a match between the second cache data (or the first cache data) and the batch of ensuing data, coherence between the second cache data (or first cache data) and the data in the memory unit 40 are checked by a comparison.

If the second cache data (or the first cache data) and the batch of ensuing data do not match, or if the two batches of data match but are incoherent with the data in the memory unit 40, step S220 is executed. In step S220, the two-way cache controller 30 goes to the memory unit 40 to fetch the batch of ensuing data. The data is input into the second cache data region 24 (or the first cache data region 22) in step S225 so that the data is ready for transmission to the peripheral device 50. Thereafter, control is transferred back to step S230.

On the other hand, if the second cache data (or the first cache data) matches the batch of ensuing data, and the matching data are coherent with the data in the memory unit 40, control is transferred to step S230. The second cache data (or the first cache data) is directly sent to the peripheral device 50.

Up to this point, execution is similar to the aforementioned steps. If the peripheral device 50 continues to request data, the two-way cache controller 30 goes to the memory unit 40 to fetch the data that comes after the first cache data and puts the data into the second cache data region 24 when the first cache data is being transmitted to the peripheral device 50. When the second cache data is being transmitted to the peripheral device 50, the two-way cache controller 30 will also go to the memory unit 40 to fetch the data that comes after the second cache data and puts the data in the first cache data region 22. This process is repeated until the peripheral device 50 no longer enables the FRAME signal.

Figure 3:
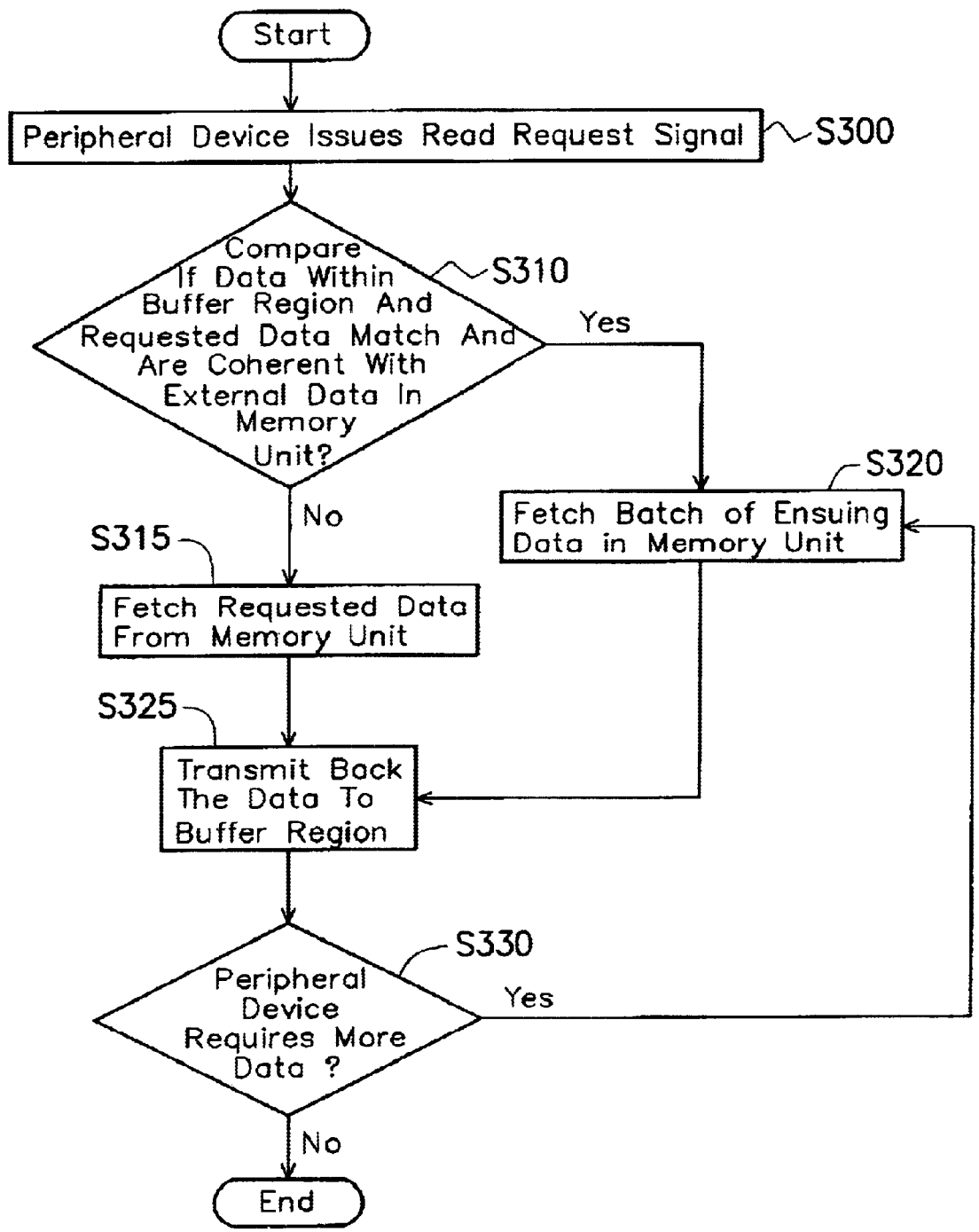
FIG. 3 is a flow chart showing the steps in operating the cache system according to an alternative embodiment of this invention.

FIG. 3 is a flow chart showing the steps in operating the cache system according to an alternative embodiment of this invention.

In step S300, a read request is sent from the peripheral device 50. The read request signal is transmitted to the two-way cache controller 30 via the peripheral device interface bus 60. On receiving the read request, the two-way cache controller 30 compares data stored inside the two-way first-in first-out buffer region 20 and the requested data in step S3 10. If the two types of data match, coherence between the data stored inside the two-way first-in first-out buffer region 20 and data stored in the memory unit 40 are checked by comparison.

If the data stored in the two-way first-in first-out buffer region 20 and the requested data do not match, or if the two types of data match but are incoherent with the data stored in the memory unit 40, the two-way cache controller 30 goes to the memory unit 40 to fetch the requested data in step S315. In step S325, the requested data is transferred back to the two-way first-in first-out buffer region 20 and stored to the first cache data region 22 (or the second cache data region 24). In step S330, if the peripheral device 50 continues to enable the FRAME signal, indicating that more data is needed, the system goes to step S320. In step S320, the system goes to the memory unit 40 to fetch a batch of data that comes after the requested data and returns the execution to step S325. The batch of ensuing data is stored in another cache data region. Here, the other cache data region refers to the second cache data region 24 (or the first cache data region 22).

If the peripheral device 50 continues to issue a data request, the two-way cache controller 30 goes to the memory unit 40 to fetch a batch of data that comes after the second cache data and then inputs the data into the first cache data region 22 when the second cache data is being transferred to the peripheral device 50. When the first cache data is being transferred to the peripheral device 50, the two-way cache controller 30 also goes to the memory unit 40 to fetch a batch of data that comes after the first cache data and inputs the data into the second cache data region 24. The process is repeated until the FRAME signal is lowered.

In step S310, if the data stored inside the two-way first-in first-out buffer region 20, for example, the first cache data (or the second cache data), matches the requested data, and the first cache data (or second cache data) and the data stored in the memory unit 40 are coherent, the first cache data (or second cache data) is transferred to the peripheral device 50 and then step S320 is executed. In step S320, the two-way cache controller 30 goes to the memory unit 40 to fetch a batch of ensuing data into another cache data region, for example, the second cache data region 24 (or the first cache data region 22). In step S325, the batch of ensuing data is input into the second cache data region 24 (or the first cache data region 22), ready for transmission to the peripheral device 50. At the end of the data transmission, system execution returns to step S330.

Similarly, if the peripheral device 50 continues to issue a data request, the two-way cache controller 30 goes to the memory unit 40 to fetch a batch of data that comes after the first cache data and then inputs the data into the second cache data region 24 when the first cache data is being transferred to the peripheral device 50. When the second cache data is being transferred to the peripheral device 50, the two-way cache controller 30 also goes to the memory unit 40 to fetch a batch of data that comes after the second cache data and inputs the data into the first cache data region 22. The process is repeated until the FRAME signal is lowered.

As shown in FIGS. 2 and 3, the second embodiment shown in FIG. 3 uses one less comparison than the first embodiment shown in FIG. 2 to find out any matching between data in the cache data buffer region and the batch of ensuing data as well as any coherence with the data in the memory unit 40. In other words, the step S210 in FIG. 2 is removed from the flow chart shown in FIG. 3. Consequently, the second embodiment can have a simpler control circuit than the first embodiment of this invention. Hence, operating efficiency at the peripheral device interface can be improved without increasing circuit complexity by using the second embodiment.

In addition, both the first and the second embodiment of this invention permit the storage of two batches of cache data (the first cache data and the second cache data) in the cache data buffer region. Hence, compared with a conventional one-way cache system that can only store a batch of cache data (either the first cache data or the second cache data), utility of the peripheral device interface is increased considerably.

In this invention, the batch of ensuing data is fetched by the two-way cache controller while data is being transferred to the peripheral device. Aside from the delay caused by the first data transmission, subsequent data transmission to the peripheral device is unaffected by reading data from the memory unit. Hence, operating speed of the peripheral device interface is increased.

In addition, both the first embodiment and the second embodiment of this invention have a depth level of two. In other words, the cache system contains two cache data regions with each cache data region capable of accommodating data up to a maximum of 32 bytes. Since an accelerated graphics port (AGP) only has one device (the accelerated graphic indicator card), a cache data region having a depth level of two produces the best results. Note that the invention is neither limited to applications such as an accelerated graphics port nor a cache data buffer region with a depth level of two. In fact, the invention is suitable for interfacing with all peripheral devices.

In summary, this invention is able to increase utilization at a peripheral device interface considerably with only a minor increase in circuit complexity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A cache system for interfacing with a peripheral device, comprising:
   a two-way buffer region having a first cache data region and a second cache data region, wherein the first cache data region stores a batch of first cache data and the second cache data region stores a batch of second cache data; and
   a two-way cache controller that receives a read request from the peripheral device and, wherein the two-way buffer region, according to the read request, is capable of retaining requested data and a batch of ensuing data that comes after the requested data, and when the peripheral device maintains a FRAME signal line in an enable state requesting more data, data that comes after the batch of ensuing data is read into the first cache data region and the second cache data region alternately.

2. The cache system of claim 1, wherein the two-way cache controller refreshes the first cache data region and the second cache data region together.

3. The cache system of claim 1, wherein the two-way buffer region includes a first-in first-out (FIFO) buffer region.

4. A method of operating a two-way cache system for carrying out data transmission between a peripheral device and a memory unit, wherein the cache system includes a two-way buffer region having a first cache data region and a second cache data region, the method comprising:
   receiving a read request from the peripheral device and checking to see if requested data is stored inside the two-way buffer region, and if the requested data is stored inside the two-way buffer region, checking the requested data stored inside the two-way buffer region to see if the requested data and data stored inside the memory unit are coherent;
   putting requested data that is coherent with the data stored inside the memory unit and a batch of ensuing data that comes after the requested data into the two-way buffer region; and
   sequentially reading data that comes after the batch of ensuing data into the two-way buffer region when the peripheral device is reading the batch of ensuing data from the two-way buffer region, if the peripheral device continues to enable a FRAME signal line.

5. The method of claim 4, wherein putting the requested data that is coherent and the batch of ensuing data into the two-way buffer region includes:
   when the requested data is not stored inside the two-way buffer region, or the requested data stored inside the two-way buffer region and the data stored inside the memory unit are non-coherent, fetching the requested data and the batch of ensuing data from the memory unit and storing in the two-way buffer region;
   when the requested data is stored inside the first cache data region and the requested data inside the first cache data region and the data stored inside the memory unit are coherent, the cache system checking the batch of second cache data stored inside the second cache data region to see if the batch of second cache data contains the batch of ensuing data and is coherent with the data stored in the memory unit, wherein if the batch of second cache data includes the batch of ensuing data and is coherent with the data stored in the memory unit, the batch of second cache data is retained, and wherein if the batch of second cache data does not includes the batch of ensuing data or is not coherent with the data stored in the memory unit, the batch of ensuing data is automatically fetched from the memory unit and stored into the second cache data region; and
   when the requested data is stored inside the second cache data region, and the requested data inside the second cache data region and the data stored inside the memory unit are coherent, the cache system checking the batch of first cache data stored inside the first cache data region to see if the batch of first cache data contains the batch of ensuing data and is coherent with the data stored in the memory unit, wherein if the batch of first cache data includes the batch of ensuing data and is coherent with the data in the memory unit, the batch of first cache data is retained, and wherein if the batch of first cache data does not includes the batch of ensuing data or is not coherent with the data in the memory unit, the batch of ensuing data is automatically fetched from the memory unit and stored into the first cache data region.

6. The method of claim 4, wherein sequentially reading data that comes after the batch of ensuing data into the two-way buffer region when the peripheral device is reading in the batch of ensuing data from the two-way buffer region, includes:

when the peripheral device reads a batch of second cache data in the second cache data region, reading data that comes after the batch of second cache data from the memory unit into the first cache data region; and when the peripheral device reads the batch of first cache data in the first cache data region, reading data that comes after the batch of first cache data from the memory unit into the second cache data region.

7. A method of operating a two-way cache system for carrying out data transmission between a peripheral device and a memory unit, wherein the cache system includes a two-way buffer region having a first cache data region and a second cache data region, the method comprising:

receiving a read request from the peripheral device and checking to see if requested data is stored inside the two-way buffer region, and if the requested data is stored inside the two-way buffer region, checking the requested data stored inside the two-way buffer region to see if the requested data and data stored inside the memory unit are coherent;

when the requested data is not stored inside the two-way buffer region, or the requested data stored inside the two-way buffer region and the data stored inside the memory unit are non-coherent, fetching the requested data and a batch of ensuing data that comes after the requested data from the memory unit and storing the requested data and the batch of ensuing data that comes after the requested data in the two-way buffer region;

when the requested data is stored inside the two-way buffer region and the requested data is coherent with the data in the memory unit, reading the batch of ensuing data; and when the peripheral device has finished reading the requested data but the peripheral device maintains a FRAME signal line in an enable state, sequentially reading data that comes after the batch of ensuing data from the memory unit into the two-way buffer region when the peripheral device is reading the batch of ensuing data from the two-way buffer region.

8. The method of claim 7, wherein reading in the batch of ensuing data when the requested data is stored inside the two-way buffer region and the requested data is coherent with the data in the memory unit, includes:

when the requested data is inside the first cache data region, the cache system reading the batch of ensuing data from the memory unit and storing that data in the second cache data region; and when the requested data is stored inside the second cache data region, the cache system reading the batch of ensuing data from the memory unit and inputting the data into the first cache data region.

9. The operating method of claim 7, wherein sequentially reading the data that come after the batch of ensuing data from the memory unit into the two-way buffer region when the peripheral device is reading the batch of ensuing data from the two-way buffer region, includes:

when the peripheral device is reading in the batch of second cache data in the second cache data region, the cache system also reading data that come after the batch of second cache data into the first cache data region; and when the peripheral device is reading in the batch of first cache data in the first cache data region, the cache system also reading data that comes after the batch of first cache data into the second cache data region.

* * * * *